(12) United States Patent
Wagner et al.

(10) Patent No.: US 8,381,286 B2
(45) Date of Patent: Feb. 19, 2013

(54) METHOD AND APPARATUS FOR THE AUTHENTICATION OF USERS OF A HYBRID TERMINAL

(75) Inventors: Matthias Wagner, Barmstedt (DE); Andreas Karanas, Hamburg (DE)

(73) Assignee: Teveo Interactive GmbH, Hamburg (DE)

( * ) Notice: Subject to any disclaimer, the term of this patent is extended or adjusted under 35 U.S.C. 154(b) by 0 days.

(21) Appl. No.: 13/019,632

(22) Filed: Feb. 2, 2011

(65) Prior Publication Data

US 2011/0197218 A1 Aug. 11, 2011

(30) Foreign Application Priority Data

Feb. 10, 2010 (DE) .......................... 10 2010 007 718

(51) Int. Cl.
*G06F 7/04* (2006.01)
(52) U.S. Cl. .............................. 726/17; 725/30; 713/182
(58) Field of Classification Search .................. None
See application file for complete search history.

(56) References Cited

U.S. PATENT DOCUMENTS

| 2008/0127254 | A1  | 5/2008 | Nakajima |         |
|--------------|-----|--------|----------|---------|
| 2008/0141296 | A1  | 6/2008 | Yoon     |         |
| 2010/0023962 | A1* | 1/2010 | Blommaert et al. | 725/31 |
| 2010/0031290 | A1  | 2/2010 | Hua et al. |       |
| 2011/0093895 | A1* | 4/2011 | Lee et al. | 725/40 |

FOREIGN PATENT DOCUMENTS

| DE | 102006045352 A1 | 4/2008 |
| JP | 2007-193464 A | 8/2007 |
| WO | 2008113827 A2 | 9/2008 |
| WO | WO 2008/113827 * | 9/2008 |

OTHER PUBLICATIONS

Mas et al.; IMS-TV: An IMS-Based Architecture for Interactive, Personalized IPTV; IEEE Communications Magazine, Nov. 2008, pp. 156-163.
German Office Action in Application Serial No. 10 2010 007 718.6-31, mailed Oct. 14, 2010 (2 pages).
Office Action dated Nov. 1, 2011 from Japanese Patent Application No. 2011-027067 (5 pages).

(Continued)

*Primary Examiner* — Shewaye Gelagay
(74) *Attorney, Agent, or Firm* — Workman Nydegger

(57) ABSTRACT

The invention concerns a method for the authentication of users of a hybrid terminal with a first registration step. The first registration step comprises entry of user identification data, request to enter a personal identification number, forwarding of the personal identification number to a registration server of an authentication apparatus, forwarding of the user identification data, validation of the user identification data, generation of a registration code, and in the event that entry of the personal identification number has not taken place, generation of the personal identification number, forwarding of the registration code to the internet-capable terminal and in the event that entry of the personal identification number has not taken place, forwarding of the personal identification number via a separate connection to the user. The method also comprises an authentication step comprising checking whether a profile file is present on the hybrid terminal, carrying out an authentication in order to establish whether the user is authorized to receive user data from the service provider and/or to send user data to the service provider, or otherwise carrying out an initial authentication and, if necessary, generation and transfer of the profile file. Furthermore, the invention concerns a corresponding apparatus for carrying out the method.

11 Claims, 2 Drawing Sheets

OTHER PUBLICATIONS

InterBEE Online, "[IBC2009] European Boradcasting Union (EBU) demonstrates Hybrid Broadcast Broadband TV HbbTV", Japan Electronics Show Association, Sep. 14, 2009, URL, http://www.inter-bee.com/ja/magazine/detail_column.html?id=344&lang=ja.

HbbTV—draft for technical specification ETSI TS 102 796 V1.1.1 (Dec. 2009) (76 pages).

Wikipedia, Authentifizierung (9 pages including translation of a section from page 1).

\* cited by examiner

METHOD AND APPARATUS FOR THE AUTHENTICATION OF USERS OF A HYBRID TERMINAL

CROSS-REFERENCE TO RELATED APPLICATIONS

This application claims the benefit of German Patent Application No. DE102010007718.6, filed on Feb. 10, 2010, entitled "Method and Apparatus for the Authentication of Users of a Hybrid Terminal", which is incorporated herein by reference.

BACKGROUND OF THE INVENTION

1. The Field of the Invention

The present invention concerns a method and an apparatus for the authentication of users of a hybrid terminal. Methods of this kind are used for the registration and authentication of a user of television sets and satellite receivers which, apart from the actual receiving part for television programs, have an additional internet interface.

2. The Relevant Technology

Methods and apparatuses for the authentication of television users are known.

A single-sign-on method for the use of a set-top box with an internet interface and a broadband interface can be found in publication DE 10 2006 045 352 A1. By means of a logon and authentication function made available by a provider, user authentication takes place after a set-top box is switched on. If authentication of the user is successful, the provider sends authentication information to the set-top box. This authentication information is then used for registration with a service provider or several service providers. The logon and authentication function is invoked after the set-top box is switched on, and provided that authentication is successful, authentication information is sent to the set-top box. This authentication information is in turn sent by means of the set-top box to a service provider and in this way the set-top box is registered with this service provider. Then a comparison is made between the service provider and the provider of the logon and authentication function for the purpose of verification of the authentication information and, if necessary, forwarding of a corresponding acknowledgement from the provider of the authentication function to the service provider.

Publication US 2008/0141296 A1 shows a method for accessing an authentication server for a digital rental television system. As soon as the television, which has both an internet connection and a digital TV receiver, is switched on, it contacts an authentication server in order to determine whether the user is a subscriber to the auxiliary service. Only after clearance by the service provider by means of the authentication server can the user access the digital television supply.

A further method can be found in publication US 2008/0127254 A1, for example. In order to ascertain whether the user of a television is known to the television, i.e. whether there are identification data of the user in the television, data for identification of the user are transmitted to the television by a wireless communications device which is within the range of vision of the television. In this case the data required for identification of the user are already present or stored in the communications device. The data received are compared with storage user profiles in the television in order then to control the television accordingly.

The method has the drawback that the data required for identification and authentication of a user are stored in the wireless communications device, so that authentication of the user can always only be effected by means of the associated communications device. This is laborious to handle and expensive. If the wireless communications apparatus is used by third parties, the true user is not identified and authorized, but the user whose identification data are stored in the wireless communications device.

BRIEF SUMMARY OF THE INVENTION

It is therefore the object of the present invention to propose a reliable method which simplifies the handling of authentication. Furthermore, it is the object of the invention to provide a corresponding apparatus for carrying out the method.

This object is achieved by a method having the features of claim 1. The method according to the invention affords the advantage that the authentication of users of a hybrid terminal is effected without being linked to hardware, but by means of a registration code assigned to the respective user as well as a personal identification number. Further, the method according to the invention affords the advantage that only logging on once—hereinafter referred to as a single sign-on—is required on the part of the user of the hybrid terminal in order to identify himself to one of the service providers or to several of the service providers. After successful authentication of the user, not only can the latter access the user data or contents of one of the service providers, but he is basically also authorized for the forwarding of user data or access to contents of other service providers.

An appropriate embodiment of the invention is characterized in that carrying out the initial authentication comprises: entry of the registration code and the personal identification number by means of the hybrid terminal, forwarding of the registration code and the personal identification number to an authentication server of the authentication apparatus via the internet interface of the hybrid terminal, checking of the registration code and personal identification number in the authentication server of the authentication apparatus by comparison of the registration code and personal identification number with the user identification data of the users who are stored on the storage medium of the authentication apparatus, and in the event that checking shows that the registration code and personal identification number can be assigned to one of the users, establishing that this user is authorized to receive the user data from the service provider and/or to send the user data to the service provider. If the user is accessing the user data of one of the service providers for the first time, he must first prove his identity by means of the initial authentication for access to the user data of the service provider. Proof of whether the user is authorized to retrieve the user data from the service provider is provided by entry of the registration code and personal identification number. Initial authentication is thus set up in the form of two-factor authentication and consequently is a particularly secure method for initial authentication of the user.

A preferred development of the invention is distinguished in that carrying out the authentication comprises: transfer of the profile file which is filed on the hybrid terminal to the authentication server of the authentication apparatus via the internet interface of the hybrid terminal, checking of the profile file in the authentication server of the authentication apparatus by comparison of the profile file with the user identification data of the users who are stored on the storage medium of the authentication apparatus, and in the event that checking shows that the profile file can be assigned to one of the users, establishing that this user is authorized to receive the user data from the service provider and/or to send the user data to the service provider. This affords the advantage that, in case of repeated access by the user to one of the service providers or its user data, no further entry is required on the part of the user for authentication. Proof of identity of the user to the service provider is given by transfer and checking of the profile file. This procedure takes place covertly for the user during access to the user data of the service provider. Thus it is also possible to access the user data of other service providers without requesting the user to actively authenticate himself each time.

According to a further preferred embodiment of the invention, carrying out the authentication comprises: entry of the personal identification number by means of the hybrid terminal, transfer of the profile file which is filed on the hybrid terminal and of the personal identification number to the authentication server of the authentication apparatus via the internet interface of the hybrid terminal, checking of the personal identification number and profile file in the authentication server of the authentication apparatus by comparison of the personal identification number and profile file with the user identification data of the users who are stored on the storage medium of the authentication apparatus, and in the event that checking shows that the personal identification number and profile file can be assigned to one of the users, establishing that this user is authorized to receive the user data from the service provider and/or to send the user data to the service provider. The additional entry of the personal identification number affords the advantage of increased security of authentication of the user. If for example the user accesses contents liable to a charge or contents which are used to process a purchase, the user's attention is on the one hand drawn to the fact that he may incur further costs subsequently by the request to enter the personal identification number. On the other hand it is ensured that the user does not accidentally access these special contents or make purchases accidentally.

A further appropriate embodiment of the invention is characterized in that communication between the internet-capable terminal and the authentication apparatus takes place via a secure internet connection by means of a secure hypertext transfer protocol. In this way, communication between the internet-capable terminal and the authentication apparatus is effectively protected against unwanted listening and spying by third parties.

According to a further preferred embodiment, the registration code comprises exclusively numerical characters. Thus the stock of characters for entry of the registration code by the user is limited only to the numbers 0, 1, 2, 3, 4, 5, 6, 7, 8 and 9, so that entry of the registration code is substantially facilitated due to the limited stock of characters. In a particularly preferred embodiment, entry of the registration code and personal identification number is effected by means of a remote control of the hybrid terminal. The registration code and personal identification number can therefore easily be entered via the number keys of the remote control.

A further appropriate embodiment of the invention is characterized in that the user data comprise at least substantially video data and/or audio data. As already described above, the user data further comprise other control data, namely, in addition to the actual audio and video data, additional data which ensure linking of the transmitted audio and video data to contents of the internet. According to a further embodiment, the user data comprise communications and clearance data which are used for processing a purchase, for example. If the user accesses contents of service providers which provide an online shop for the purchase of articles or services, processing of the purchase takes place by forwarding of corresponding communications and clearance data via the broadband interface.

The object is also achieved by an apparatus having the features of claim 11. The resulting advantages have already been described in connection with the method. To avoid repetition, reference will therefore be made to the corresponding passages of the description.

Both for the method according to the invention and for the apparatus according to the invention, it may be advantageous that the hybrid terminal is designed as an HbbTV (hybrid broadcast broadband TV) terminal which is defined in more detail in the draft for technical specification TS 102 796 V1.1.1 (2009-12)—hereinafter referred to as the HbbTV standard for short—of the European Telecommunications Standards Institute in 2009. According to the HbbTV standard, a platform is fixed for signaling, transport and presentation of extended and interactive applications for running on hybrid terminals which have both a broadband interface and an internet interface. Hybrid terminals of this kind are preferably televisions sets, satellite receivers, cable television receivers, set-top boxes or the like. The hybrid terminal therefore communicates both via the internet interface and via the broadband interface. If the hybrid terminal is designed for example as an extended television set or set-top box, the hybrid terminal receives via the broadband interface, in addition to the user data in the form of audio and video data, additional information, for example in the form of an embedded internet address, which allows linking of the television signal to information and value-added offers which can be retrieved via the internet. By means of this additional information, it is possible to communicate with the internet via the internet interface of the hybrid terminal and to selectively access contents on the internet which are thus linked to the user data transmitted via the broadband interface. The user data are preferably transmitted unidirectionally, for example starting from a television transmitter to the hybrid terminal. The broadband interface is therefore preferably designed as a DVB-S, DVB-S2, DVB-T or DVB-C interface. However, the broadband interface is not limited exclusively to the reception of television signals according to the above-mentioned DVB standard, but basically also adapted and designed to receive television signals by other common television signal transmission methods.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
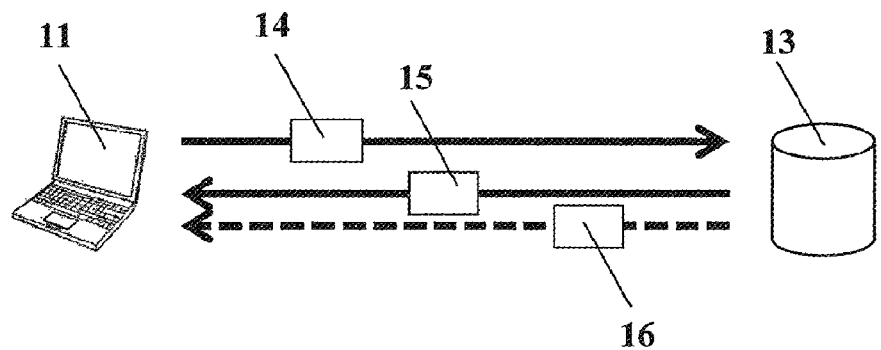
FIG. 1 illustrates schematically the process of a first registration step.

FIG. 1 shows schematically the process of the first registration step. A user of a hybrid terminal 10 first enters his user identification data 14 by means of an internet-capable terminal 11. Any ordinary internet-capable terminal is suitable for entry of the user identification data 14, for example a laptop, a desktop computer, a PDA, an internet-capable mobile telephone or the like. Entry of the user identification data 14, which are for example personal data such as name, address, bank or credit card data of the user, are forwarded from the internet-capable terminal 11 via a first internet connection 12 to a registration server of an authentication apparatus 13. To ensure that the first internet connection 12 is safe from eavesdropping and protected against intervention from outside, communication between the internet-capable terminal 11 and the authentication device 13 is effected advantageously via a secured internet connection by means of a secure hypertext transfer protocol (https protocol). Alternatively, communication between the internet-capable terminal 11 and the authentication apparatus 13 may also be unsecured or by other encryption methods.

Further, the user is asked to enter a personal identification number 16. The personal identification number 16 may be freely chosen by the user, i.e. the user can stipulate the personal identification number 16 as desired. The personal identification number 16 is also entered by means of the internet-capable terminal 11. Here, the user has the choice of whether he would like to choose the personal identification number 16 himself. If the user complies with the request to enter the personal identification number 16, after entry the personal identification number 16 is forwarded from the internet-capable terminal 11 to the registration server of the authentication apparatus 13 via the first internet connection. If, on the other hand, the user does not comply with the request to enter the personal identification number 16, the personal identification number 16 is generated in a step described below. In other words, in the event that the user stipulates the personal identification number 16 himself and enters it by means of the internet-capable terminal 11, the personal identification number 16 as well as the user identification data 14 are forwarded from the internet-capable terminal 11 via a first internet connection 12 to the registration server of the authentication apparatus 13. If the user does not enter a personal identification number 16, only forwarding of the user identification data 14 takes place. The personal identification number 16 is only then generated in the authentication apparatus 13.

The user identification data 14 are then validated by comparing the user identification data 14 with a predetermined user reference data record. The user reference data record comprises information which is suitable for checking the identity of the user with the aid of the user identification data 14 present on the registration server. In other words, the user reference data record is adapted to the user identification data 14 to be checked. For instance, for checking account data this record comprises information on the creditworthiness of the user, and for checking credit card data it comprises corresponding control data which are necessary to establish whether the user identification data 14 available correspond to a valid credit card. Naturally, the user reference data record can also be used for verification of age or simply to establish the actual identity of the user.

In the event that the user identification data 14 correspond to one of the predetermined user reference data records, the user identification data 14 of the user are stored on a storage medium of the authentication apparatus 13. The user identification data 14 are therefore permanently secured and can be retrieved at any time in the authentication apparatus 13. All the usual known storage technologies are used as the storage medium.

In the event that the user has not entered a personal identification number 16 beforehand, generation of a registration code 15 and the personal identification number 16 then takes place. If the user has already stipulated and entered the personal identification number 16 beforehand, only generation of the registration code 15 takes place.

With the aid of the registration code 15 and the personal identification number 16 the user can be identified uniquely, i.e. the registration code 15 and/or the personal identification number 16 are assigned to the user. Preferably the registration code 15 comprises a 16-digit numerical hash value which is generated on the basis of the user identification data 14. Generation of the hash value allows a plausibility check to be carried out later in order to be able to check the correctness of the registration code 15. Naturally, the registration code 15 is not exclusively limited to 16-digit numerical hash values, but may have any registration code length.

The registration code 15 is then forwarded from the registration server of the authentication apparatus 13 to the internet-capable terminal 11 via the first internet connection 12. The user can have the registration code 15 outputted or displayed to him on the internet-capable terminal 11 and note it for subsequent use, if need be.

In the event that the personal identification number 16 has not been entered by the user, and therefore the personal identification number 16 has been generated in the authentication apparatus 13, the personal identification number 16 is forwarded from the registration server to the user or to the internet-capable terminal 11 on a separate path. For example, the personal identification number 16 is forwarded to the user by e-mail or SMS. Also it is possible to forward the personal identification number 16 not electronically, but by post. In any case, forwarding of the personal identification number 16 does not take place within a message via the first internet connection 12. Consequently it is also possible to forward both the personal identification number 16 and the registration code 15 exclusively via the first internet connection 12. Forwarding in this way, however, takes place with a time lag such that, when listening into the first internet connection 12, an unauthorized third party does not gain knowledge of either the registration code 15 or the personal identification number 16. Thus unauthorized third parties are prevented from gaining knowledge of either the registration code 15 or the personal identification number 16. Hence the possibility of abuse by unauthorized third parties is to a very large extent excluded.

As soon as the user would like to access a service provider 17, 18, and therefore the user wishes to obtain user data from a service provider 17, 18 or would like to use services of a service provider 17, 18, it is first established whether the user is authorized to access the service provider 17, 18. This check is done in the authentication step described below.

For this purpose it is checked whether a profile file 19 assigned to the user is present on the hybrid terminal 10, wherein the hybrid terminal 10 communicates via the internet interface with an application server of the authentication apparatus 13. If the user tries to access a service provider 17, 18, the application server begins with checking whether a profile file 19 assigned to the user is present on the hybrid terminal. Thus it is established whether the user has already previously accessed a service provider 17, 18 liable to authentication. The profile file 19 is designed as a cookie or as a client/server certificate, so that the user can be identified uniquely with the aid of the profile file 19.

In the event that the profile file 19 assigned to the user is present on the hybrid terminal 10, an authentication is carried out in order to establish whether the user is authorized to receive user data from the service provider 17, 18. Authorization of the user presupposes that the latter has been identified in the registration step and the user has been assigned a registration code 15 generated for unique identification as well as a personal identification number 16. If there is no profile file 19 assigned to the user on the hybrid terminal 10, the initial authentication is carried out in order to establish whether the user is authorized to receive the user data from the service provider 17, 18 and/or to send the user data to the service provider 17, 18. If the initial authentication shows that the user is entitled, i.e. authorized to receive the user data from the service provider 17, 18 and/or to send the user data to the service provider, the profile file 19 assigned to the user is generated. The profile file 19 is transferred from the authentication server of the authentication apparatus 13 to the hybrid terminal 10 and filed on the hybrid terminal 10, i.e. stored permanently on the hybrid terminal 10. The profile file 19 is also preserved after a restart of the hybrid terminal 10 and over longer phases without power. In other words, by the presence or absence of the profile file 19 on the hybrid terminal 10 it is detected whether the user has already previously accessed a service provider 17, 18 as an authorized user, or whether this is the first access to one of the service providers 17, 18.

After authentication or initial authentication and establishment that the user is an authorized user, a clearance message is transmitted to one or more service providers 17, 18. By means of the clearance message, it is signaled to the service provider 17, 18 that the user has been authenticated as an authorized user for access to the services of the service provider 17, 18. The clearance message is in this case transmitted via the second internet connection 20 from the authentication apparatus 13 to the service providers 17, 18. In return, the user data are forwarded from the service provider 17, 18 via the broadband interface to the hybrid terminal 10. The forwarding of user data is here not limited only to forwarding of user data from the service provider 17, 18 to the hybrid terminal 10. Alternatively, forwarding also includes the transmission of data or user data from the hybrid terminal 10 to the service provider 17, 18. This is the case, for example, when the user uses services liable to a charge through the service provider 17, 18, e.g. when purchasing goods through the service provider 17, 18.

Figure 2:
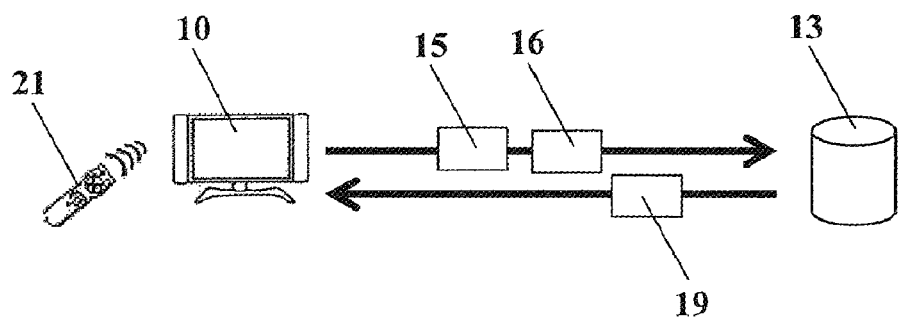
FIG. 2 illustrates schematically carrying out an initial authentication.

A preferred development of the invention is shown in FIG. 2, which shows the initial authentication being carried out schematically. For initial authentication, the user is asked to enter the registration code 15 and the personal identification number 16 by means of the hybrid terminal 10. The registration code 15 and the personal identification number 16 are forwarded via the internet interface of the hybrid terminal 10 to an authentication server of the authentication apparatus 13. The authentication server checks the registration code 15 in connection with the personal identification number 16 to see whether the registration code 15 and the personal identification number 16 can be assigned to one of the users. This is done by comparison of the registration code 15 and personal identification number 16 with the user identification data 14 which are stored on the storage medium of the authentication apparatus 13. If the comparison shows that the registration code 15 and the personal identification number 16 can be assigned to one of the users, it is established that this user is authorized to receive the user data from the service provider 17, 18 and/or to send the user data to the service provider 17, 18. Then the profile file 19 assigned to the user is transferred from the authentication server of the authentication apparatus 13 via the internet interface to the hybrid terminal 10 and filed on the hybrid terminal 10.

Figure 3:
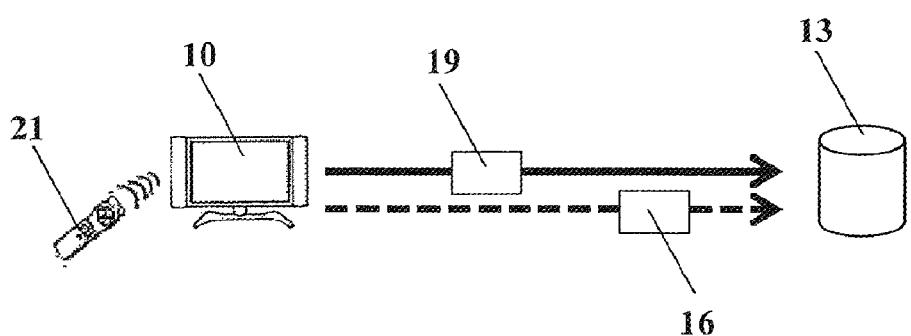
FIG. 3 illustrates schematically carrying out an authentication.

According to a further preferred embodiment of the invention, corresponding to carrying out an authentication which is shown schematically in FIG. 3, if a user would like to access a service provider 17, 18, the profile file 19 filed on the hybrid terminal 10 is transferred to the authentication server of the authentication apparatus 13 via the internet interface of the hybrid terminal 10. The profile file 19 is compared in the authentication server of the authentication apparatus 13 by comparison of the profile file 19 with the user identification data 14. The user identification data 14 are stored on the storage medium of the authentication apparatus 13. If the comparison or the check shows that the profile file 19 can be assigned to one of the users, this user is recognized as an authorized user and it is established that this user is authorized to receive the user data from the service provider 17, 18 and/or to send the user data to the service provider. In other words, the user is uniquely identified on the basis of the presence of the profile file 19 on the hybrid terminal 10 and recognized as an authorized user. Hence the user can be uniquely identified after a single access to a service provider 17, 18 including authentication having taken place, by the presence of the profile file 19. This affords the advantage that the user is authenticated for all service providers 17, 18 for which the profile file shows the user as an authorized user. If the user accesses a further service provider 17, 18 in order to receive user data from the latter or send user data to the latter, the check to see whether the user is authorized for this access to the service provider 17, 18 is done via the presence of the profile file 19 on the hybrid terminal 10. In other words, the single authentication by entry of the registration code 15 and personal identification number 16 is sufficient to be authenticated as an authorized user for a plurality of service providers 17, 18, without having to enter the registration code 15 and personal identification number 16 again every time another service provider 17, 18 is accessed.

According to a further preferred embodiment of the invention, apart from forwarding of the profile file 19, in addition the entry and subsequent forwarding of the personal identification number 16 are effected. If user data requiring special care with respect to identification and authentication of the user are to be received from one of the service providers 17, 18 or sent to it, for example when accessing further contents liable to a charge or the online conclusion of purchase contracts, the user is asked to enter his personal identification number 16. Both the profile file 19 and the personal identification number 16 are transmitted via the internet interface of the hybrid terminal 10 to the authentication server of the authentication apparatus 13. If the check of the personal identification number 16 and profile file 19 shows that the latter can be assigned to one of the users, it is established that this user is authorized to receive the user data from the service provider 17, 18 and/or to send the user data to the service provider. The user's authorization is checked by comparison of the personal identification number 16 and the profile file 19 with the corresponding user identification data 14 which are stored on the storage medium of the authentication apparatus.

Preferably, the personal identification number 16 can be freely chosen by the user and comprises usually four numerical characters. In this way authentication is particularly convenient for the user, because only four numerical characters have to be entered. Alternatively, the personal identification number has more than four characters and further also comprises any desired non-numerical characters.

A further embodiment is distinguished in that entry of the registration code 15 and personal identification number 16 is effected by means of a remote control 21 of the hybrid device. In this way the user can very conveniently, with the remote control 21 which is required to operate the hybrid terminal 10 anyway, enter the registration code 15 and the personal identification number 16.

According to a further preferred embodiment, the user data comprise at least essentially video data and/or audio data. Typically, the user data comprise digital television data. But the user data are not exclusively limited to television data, but include any form of audio and video data. Further, the user data include control data which are usually also transmitted for correct transmission of the audio and video data.

For linking the audio and video data, i.e. the contents forwarded by the service providers 17, 18, the user data further comprise embedded internet addresses. Hence synchronization between the user data, for example a current television program, and ordinary HTML internet pages takes place. The user data therefore comprise trigger information as well as internet addresses which are evaluated by the hybrid terminal 10. This allows the user to access corresponding contents on the internet which are assigned to the user data in time and contents. In this way the service providers can provide interactive applications and information which the user can access interactively. According to an alternative embodiment, the user data comprise communications and clearance data which are required to process online transactions between the user and the service provider 17, 18 via the broadband interface.

Figure 4:
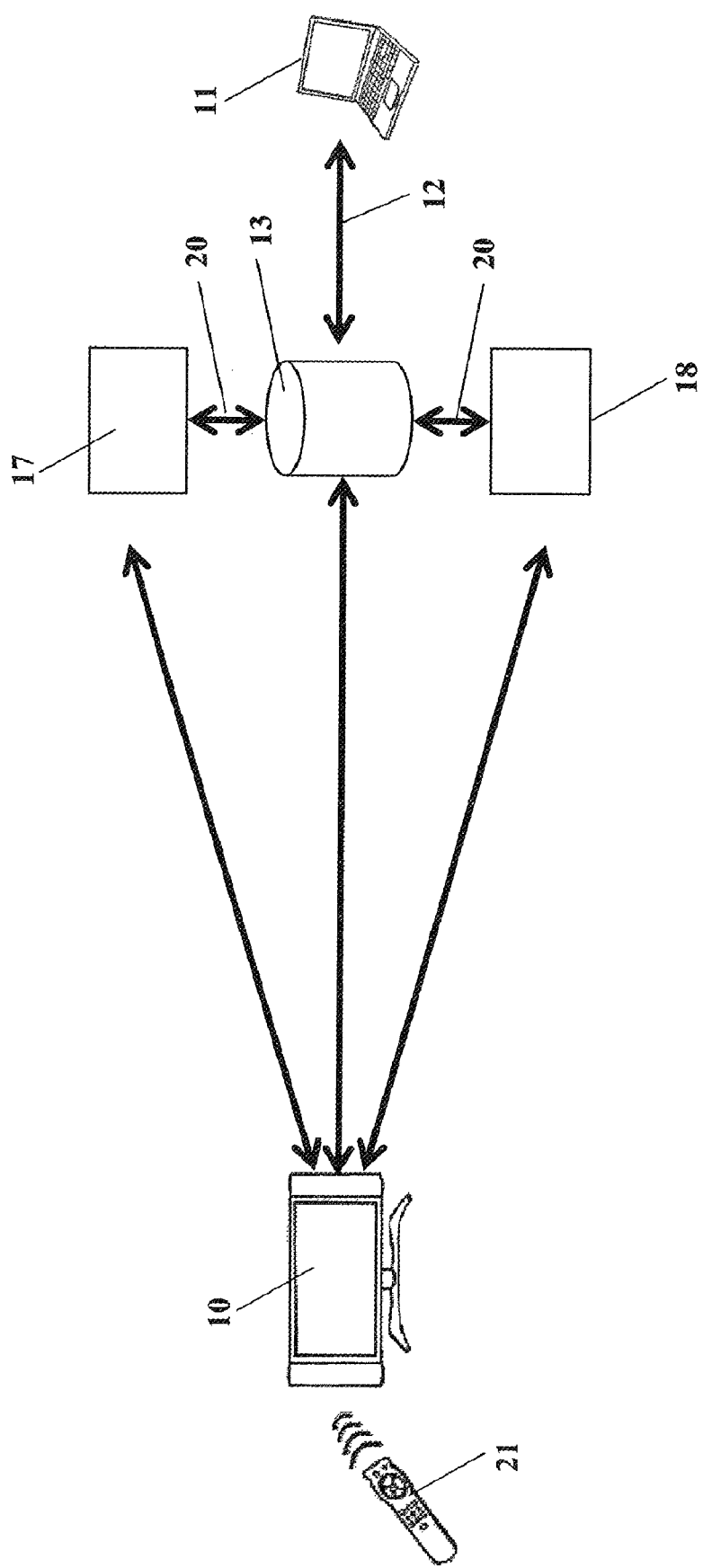
FIG. 4 illustrates a basic diagram of the apparatus according to the invention.

FIG. 4 shows a basic diagram of the apparatus according to the invention. The apparatus comprises the hybrid terminal 10 with at least one internet interface and at least one broadband interface, the authentication apparatus 13, wherein the authentication apparatus 13 comprises the registration server, the application server, the authentication server and at least one storage medium. Alternatively, the registration and application servers and the authentication server are implemented on one server. The hybrid terminal 10 is connected via the internet interface to the authentication apparatus 13 and via the broadband interface to at least one service provider 17, 18. The authentication apparatus 13 is connected via the second internet connection to at least one of the service providers 17, 18 and is designed in such a way that for example the clearance message can be transmitted from the authentication apparatus 13 to the service provider 17, 18.

Further, the internet-capable terminal 11 is connected via the first internet connection 12 to the registration server of the authentication apparatus 13. The registration server is in this case adapted to validate user identification data which are forwarded from the internet-capable terminal 11 to the registration server via the first internet connection 12, by comparison of user identification data 14 with a predetermined user reference data record, and in the event that the user identification data 14 correspond to the predetermined user reference data record, to store the user identification data 14 of the user on the storage medium.

Further, the registration server is adapted to generate the registration code 15 and the personal identification number 16, wherein the registration code 15 and/or the personal identification number 16 are assigned to the user, to forward the registration code 15 from the registration server of the authentication apparatus 13 to the internet-capable terminal 11 via the first internet connection 12, and to forward the personal identification number 16 from the registration server via a separate connection to the user or to the internet-capable terminal 11. Alternatively, the registration server is adapted to generate the registration code 15, wherein the registration code 15 is assigned to the user, and to forward the registration code 15 from the registration server of the authentication apparatus 13 to the internet-capable terminal 11 via the first internet connection 12. In this case there is no forwarding of the personal identification number 16 from the registration server to the user or to the internet-capable terminal 11. This case occurs when the user has first stipulated the personal identification number 16 himself.

The registration server is further designed and adapted in such a way as to check whether the profile file 19 assigned to the user is present on the hybrid terminal 10, wherein the hybrid terminal 10 is designed to communicate via the internet interface with the application server of the authentication apparatus 13, and in the event that the profile file 19 assigned to the user is present on the hybrid terminal 10, to carry out the authentication in order to establish whether the user is authorised to receive user data from the service provider 17, 18, or otherwise to carry out the initial authentication in order to establish whether the user is authorised to receive the user data from the service provider 17, 18 and/or to send the user data to the service provider 17, 18, to generate the profile file 19, wherein the profile file 19 is assigned to the user, to transfer the profile file 19 from the authentication server of the authentication apparatus 13 via the internet interface to the hybrid terminal 10, wherein the profile file 19 is filed on the hybrid terminal 10, and after the initial authentication or the authentication, provided that the user has been authenticated as an authorised user, to transmit a clearance message to at least one of the service providers 17, 18 and to forward the user data from the service provider 17, 18 to which transmission of the clearance message has taken place, wherein the hybrid terminal 10 is adapted to communicate with the service provider for forwarding of the user data via the broadband interface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for authenticating a plurality of users of a hybrid terminal, wherein the hybrid terminal communicates via at least one internet interface and communicates via at least one broadband interface with at least one service provider, comprising:

at least one first registration step comprising:
entry of user identification data of at least one user of said plurality of users by means of an internet-capable terminal;
requesting the user to enter a personal identification number by means of the internet-capable terminal, wherein the personal identification number is freely chosen by the user;
in response to entry of the personal identification number has been carried out by the user, forwarding of the personal identification number from the internet-capable terminal to a registration server of an authentication apparatus via a first internet connection;

forwarding of the user identification data of the user from the internet-capable terminal to the registration server of the authentication apparatus via the first internet connection;

validating of the user identification data which are present on the registration server of the authentication apparatus, by comparison of the user identification data with a predetermined user reference data record, and in response to the user identification data corresponding to the predetermined user reference data record;

storing of the user identification data on a storage medium of the registration server of the authentication apparatus;

generating at least one registration code, wherein the registration code is assigned to the user;

in response to entry of the personal identification number by the user has not taken place, generating of at least the personal identification number, wherein the personal identification number is assigned to the user;

forwarding of the registration code from the registration server of the authentication apparatus to the internet-capable terminal via a communication path that is separate and different from the first internet connections; and in response to entry of the personal identification number by the user has not taken place, forwarding of the personal identification number from the registration server of the authentication apparatus via a second communication path that is separate and different form the first internet connection to the user or to the internet-capable terminal; and an authentication step comprising:

checking whether a profile file assigned to the user is present on the hybrid terminal, wherein the hybrid terminal communicates via the internet interface with an application server of the authentication apparatus; and in response to the profile file assigned to the user is present on the hybrid terminal, a) carrying out an authentication in order to establish whether the user is authorized to receive user data from the service provider and/or to send user data to the service provider, wherein carrying out the authentication comprises entry of the personal identification number by the hybrid terminal and transfer of the profile file which is stored on the hybrid terminal to the application server of the authentication apparatus via the internet interface of the hybrid terminal and in response checking the profile file is stored in the application server of the authentication apparatus establishing the user as authorized user, or otherwise, b) carrying out an initial authentication in order to establish whether the user is authorized to receive the user data from the service provider and/or to send the user data to the service provider, wherein carrying out the initial authentication comprises entry of the registration code and the personal identification number by the hybrid terminal; forwarding of the registration code and the personal identification number to the application server of the authentication apparatus via the internet interface of the hybrid terminal; and in response to the initial authentication shows that the user is authorized, generation of the profile file, wherein the profile file is assigned to the user;

transfer of the profile file from the application server of the authentication apparatus via the internet interface to the hybrid terminal, wherein the profile file is stored on the hybrid terminal; and after carrying out the initial authentication or carrying out the authentication, provided that the user has been authenticated as an authorized user, transmission of a clearance message to the at least one of the service providers; and forwarding of the user data from the service provider to which transmission of the clearance message has taken place, wherein the hybrid terminal communicates with the service provider for forwarding of the user data via the broadband interface.

2. The method according to claim 1, further comprising checking of the registration code and the personal identification number in the application server of the authentication apparatus by comparison of the registration code and the personal identification number with the user identification data stored on the storage medium of the application server of the authentication apparatus, and in response to checking shows that the registration code and the personal identification number are assigned to the user;

establishing that the user is authorized to receive the user data from the service provider and/or to send the user data to the service provider.

3. The method according to claim 1, further comprising checking of the profile file in the application server of the authentication apparatus by comparison of the profile file with the user identification data stored on the storage medium of the the application server of the authentication apparatus, and in response to checking shows that the profile file is assigned to the user; and establishing that the user is authorized to receive the user data from the service provider and/or to send the user data to the service provider.

4. The method according to claim 1, further comprising entry of the personal identification number by means of the hybrid terminal;

transfer of the profile file which is stored on the hybrid terminal and of the personal identification number to the application server of the authentication apparatus via the internet interface of the hybrid terminal; and checking of the personal identification number and the profile file in the application server of the authentication apparatus by comparison of the personal identification number and the profile file with the user identification data stored on the storage medium of the application server of the authentication apparatus, and in the event that checking shows that the personal identification number and the profile file assigned to the user; and establishing that the user is authorized to receive the user data from the service provider and/or to send the user data to the service provider.

5. The method according to claim 1, further comprising wherein the hybrid terminal communicates via the internet interface and the broadband interface according to the hybrid broadcast broadband TV (HbbTV) standard, wherein the hybrid terminal is designed as an HbbTV terminal.

6. The method according to claim 1, further comprising wherein communication between the internet-capable terminal and the application server of the authentication apparatus takes place via a secure internet connection by means of a secure hypertext transfer protocol.

7. The method according to claim 1, further comprising wherein the registration code comprises exclusively numerical characters.

8. The method according to claim 2, further comprising wherein the entry of the registration code and the personal identification number is effected by means of a remote control of the hybrid terminal.

9. The method according to claim 1, further comprising wherein the user data comprise at least one of video data and/or audio data.

10. The method according claim 1, further comprising wherein the user data comprise communications and clearance data.

11. An apparatus for authenticating a plurality of users of a hybrid terminal comprising:
- at least one hybrid terminal with at least one internet interface and at least one broadband interface and communicates via at least one broadband interface with at least one service provider;
- an authentication apparatus, wherein the authentication apparatus comprises a registration server, an application server, an authentication server and at least one storage medium;
- and wherein the hybrid terminal is connected via the internet interface to the authentication apparatus and via the broadband interface to the at least one service provider;
- and wherein the authentication apparatus is connected via a second internet connection to at least one of the service providers;
- an internet-capable terminal which is connected via a first internet connection to the registration server;
- wherein the registration server is configured:
- to validate user identification data which are forwarded from the internet-capable terminal to the registration server via the first internet connection, by comparison of user identification data with a predetermined user reference data record, and in response to the user identification data corresponding to the predetermined user reference data record;
- to store the user identification data on the storage medium;
- to generate at least one registration code and at least one personal identification number, wherein the registration code and the personal identification number are assigned to the user;
- to forward the registration code from the registration server of the authentication apparatus to the internet-capable terminal via a communication path that is separate and different from the first internet connection; and
- to forward the personal identification number from the registration server via a second communication path that is separate and different form the first internet connection to the user or to the internet-capable terminal;
- and to check whether a profile file assigned to the user is present on the hybrid terminal, wherein the hybrid terminal is designed to communicate via the internet interface with an application server of the authentication apparatus; and
- in response to the profile file assigned to the user is present on the hybrid terminal,
  a) to carry out an authentication in order to establish whether the user is authorized to receive user data from the service provider, wherein carrying out the authentication comprises entry of the personal identification number by the hybrid terminal and transfer of the profile file which is stored on the hybrid terminal to the application server of the authentication apparatus via the internet interface of the hybrid terminal and in response checking the profile file is stored in the application server of the authentication apparatus establishing the user as authorized user, or otherwise
  b) to carry out an initial authentication in order to establish whether the user is authorized to receive the user data from the service provider and/or to send the user data to the service provider, wherein carrying out the initial authentication comprises entry of the registration code and the personal identification number by the hybrid terminal and forwarding of the registration code and the personal identification number to the application server of the authentication apparatus via the internet interface of the hybrid terminal;
- in response to the initial authentication showing that the user is authorized, to generate the profile file, wherein the profile file is assigned to the user;
- to transfer the profile file from the application server of the authentication apparatus via the internet interface to the hybrid terminal, wherein the profile file is stored on the hybrid terminal;
- and after the initial authentication or the authentication, provided that the user has been authenticated as an authorized user;
- to transmit a clearance message to the at least one of the service providers; and
- to forward the user data from the service provider to which transmission of the clearance message has taken place, wherein the hybrid terminal is configured to communicate with the service provider for forwarding of the user data via the broadband interface.

* * * * *